(No Model.)
N. R. SAULSBURY.
FLUXING MACHINE.
No. 569,062. Patented Oct. 6, 1896.
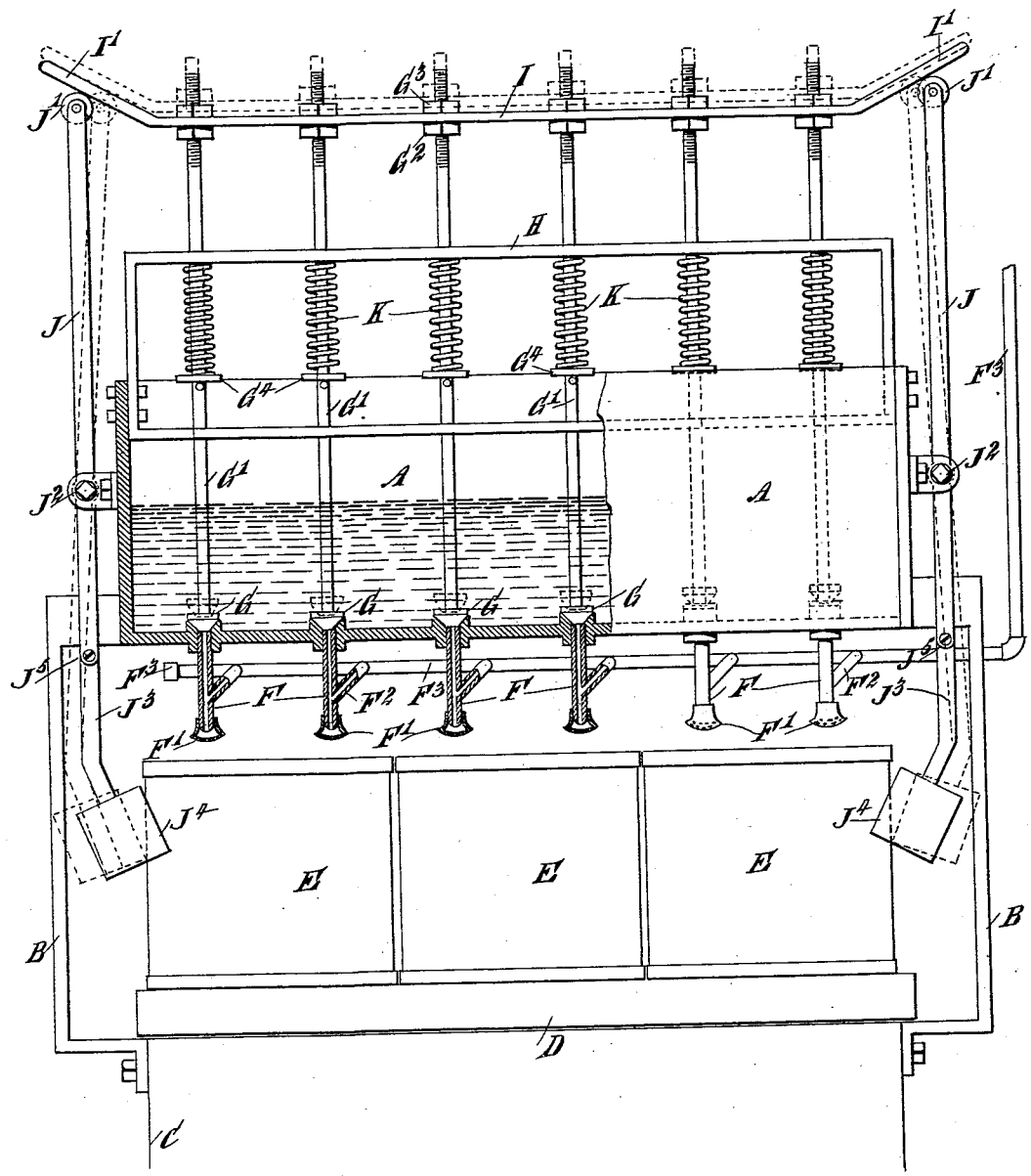
WITNESSES:
William P. Gaebel.
Theo. G. Hoster
INVENTOR
N. R. Saulsbury.
BY Munn & Co
ATTORNEYS.

UNITED STATES PATENT OFFICE.

NEHEMIAH R. SAULSBURY, OF RIDGELY, MARYLAND.

FLUXING-MACHINE.

SPECIFICATION forming part of Letters Patent No. 569,062, dated October 6, 1896.

Application filed November 12, 1895. Serial No. 568,686. (No model.)

*To all whom it may concern:*

Be it known that I, NEHEMIAH R. SAULSBURY, of Ridgely, in the county of Caroline and State of Maryland, have invented a new and Improved Fluxing-Machine, of which the following is a full, clear, and exact description.

The invention relates to the capping of tin cans; and its object is to provide a new and improved fluxing-machine which is simple and durable in construction, very effective in operation, and arranged to deliver the proper amount of acid to the cans preparatory to soldering them.

The invention consists of certain parts and details and combinations of the same, as will be fully described hereinafter, and then pointed out in the claims.

Reference is to be had to the accompanying drawing, forming a part of this specification, in which the figure is a side elevation of the improvement with part in section.

The improved fluxing-machine is provided with a tank A, containing the liquid flux or acid and supported by brackets B on the can-capping machine C, through which pass trays or other receptacles D, containing a number of cans E to be fluxed by the machine and afterward soldered in the usual manner. The cans E are adapted to pass under the tank A below the outlet-pipes or nozzles F, extending downwardly from the bottom of the tank A to carry the acid from the tank to the cans in the desired quantity.

The upper end of each nozzle F is normally closed by a valve G, arranged within the tank A and secured on an upwardly-extending valve-stem G', fitted to slide vertically in suitable bearings H, attached to the tank A, as shown in the drawing.

The extreme upper end of each valve-stem G' is threaded and connected by nuts G² G³ with a bar I, formed with inclined ends I', engaged on the under side by friction-rollers J', journaled in the upper ends of levers J, fulcrumed at J² to the ends of the tank A. On the lower ends of the levers J are held extensions J³, each carrying at its lower end a friction-roller J⁴, adapted to be engaged by the outside can in the tray E, so that the cans in passing the said friction-rollers push the latter outward to impart a swinging movement to the levers J, as indicated in dotted lines in the drawing, and lift the bar I, and consequently the valve-stems G' and valves G. The latter are thus raised off their seats, so that the acid or flux contained in the tank A can flow through the nozzles F down upon the cans E while the latter pass under the tank. As soon as the cans have left the friction-rollers J⁴ then the valves G are instantly closed by springs K, coiled on the valve-stems G' and resting with their upper ends on the bearing H and their lower ends on washers G⁴, secured on said stems.

The levers J connect with the extensions J³ by set-screws J⁵, so that any desired angle can be given to the extensions to insure a more or less swinging of the levers J to hold the valves G open a longer or a shorter time and permit more or less acid to flow to the passing cans. It will be seen that the amount of acid passing from the tank to the cans can be regulated by adjusting the nuts G² G³ on the upper threaded ends of the valve-stems G'. It is understood that the levers J, as well as the extensions J³ and friction-rollers J⁴, return to their normal position after the cans have passed by the downward movement of the bar I, caused by the springs K.

As shown in the drawing, three cans are arranged abreast; but it is evident that the machine can be constructed in such a manner that the cans in single file can act on the friction-rollers J⁴ to open the valves G, or two cans abreast for the same purpose may be employed.

In order to spray the acid onto the cans instead of delivering it in bulk, I screw or otherwise fasten on the lower end of each nozzle a perforated spraying cap or rose F'', so that the acid flowing through the nozzle is sprayed onto the can. Each nozzle F is connected by a branch pipe F² with a compressed-air-supply pipe F³ to insure a proper flow of the acid.

Having thus fully described my invention, I claim as new and desire to secure by Letters Patent—

1. A fluxing-machine, comprising a tank provided with outlets in its bottom, vertically-sliding and spring-pressed valves in the tank for closing said outlets, and pivoted levers controlled by the movement of the cans for raising the valves to open the outlets, substantially as described.

2. A fluxing-machine, comprising a tank provided with outlets in its bottom, a plurality of vertically-sliding and spring-pressed valves in the tank for closing the outlets, a bar connecting the upper ends of the valve-stems, and means for engaging the said bar to raise the valves and open the outlets, substantially as described.

3. A fluxing-machine, comprising levers having friction-rollers extending into the path of the cans to be fluxed, an acid-tank having outlets, spring-pressed valves for normally closing said outlets and adapted to be opened by said levers, and a bar on which the stems of said valves are fastened, said bar being provided with inclined ends engaged by said levers, substantially as shown and described.

4. A fluxing-machine, comprising an acid-tank having valved outlets, and levers for opening said valves, and formed with extensions adapted to be set at angles to the levers, substantially as shown and described.

5. A fluxing-machine, comprising a tank provided with nozzles, sliding and spring-pressed valves for closing the nozzles, a bar having inclined ends and to which the valve-stems are secured and levers pivoted to the tank and having one end engaging the inclined ends of the said bar, said levers being controlled by the movement of the cans, substantially as described.

6. A fluxing-machine, comprising a tank provided with nozzles projecting from its bottom, vertically-sliding and spring-pressed valves in the tank for closing the nozzles, a bar having upwardly-inclined ends and to which the upper ends of the valve-stems are adjustably secured, and pivoted levers having rollers on their upper ends engaging the inclined ends of the said bar, said levers being provided with adjustable extensions carrying rollers, substantially as described.

7. In a fluxing-machine, the combination with a tank provided with nozzles, valves for closing said nozzles, and means for opening the valves, said means being controlled by the movement of the cans, of an air-supply pipe, and branch pipes connecting the nozzles with the said air-pipe, substantially as described.

NEHEMIAH R. SAULSBURY.

Witnesses:
EDWARD L. MELVIN,
BENJ. H. JOHNSON.